US 6,508,475 B1

(12) United States Patent
Strodtman et al.

(10) Patent No.: US 6,508,475 B1
(45) Date of Patent: Jan. 21, 2003

(54) HOLDING APPARATUS WITH IMPROVED RETENTION ABILITY AND METHOD OF HOLDING A TOOL

(75) Inventors: John D. Strodtman, Wheaton, IL (US); Peter J. Wrenn, Oak Park, IL (US)

(73) Assignee: Hudson Precision Products Co., Broadview, IL (US)

( * ) Notice: Subject to any disclaimer, the term of this patent is extended or adjusted under 35 U.S.C. 154(b) by 0 days.

(21) Appl. No.: 10/000,682

(22) Filed: Oct. 31, 2001

(51) Int. Cl.$^7$ ................................................ B23B 31/20
(52) U.S. Cl. ........................................ 279/46.3; 279/49
(58) Field of Search ....................... 279/42, 43.2, 46.1, 279/46.3, 47–59

(56) References Cited

U.S. PATENT DOCUMENTS

| | | | | |
|---|---|---|---|---|
| 184,445 A | * | 11/1876 | Trump et al. | 279/49 |
| 246,904 A | | 9/1881 | Peck | |
| 990,087 A | | 4/1911 | Whitehead | |
| 1,409,311 A | | 3/1922 | Olson | |
| 1,438,391 A | | 12/1922 | Nutter | |
| 1,841,919 A | * | 1/1932 | Sederholm | 279/54 |
| 2,176,071 A | * | 10/1939 | Hall | 279/54 |
| 2,211,216 A | | 8/1940 | Oster | 51/170 |
| 2,282,674 A | * | 5/1942 | Pigott | 279/51 |
| 2,341,529 A | * | 2/1944 | Cohen | 279/48 |
| 2,491,167 A | | 12/1949 | Drew | 279/48 |
| 2,755,094 A | * | 7/1956 | Benjamin | 279/47 |
| 2,842,020 A | | 7/1958 | Tarquinio | 81/177 |

(List continued on next page.)

FOREIGN PATENT DOCUMENTS

| | | | |
|---|---|---|---|
| GB | 402536 | 12/1933 | |
| GB | 770207 A | * 3/1957 | 279/48 |
| GB | 996557 | 12/1965 | |

OTHER PUBLICATIONS

Digital photographs (side and top angled views) of a precision collet (Collet 1), manufactured by Kennametal of Latrobe, PA.
Digital photographs (side and top angled views) of a precision collet (Collet 2), manufactured by Kennametal of Latrobe, PA.
Digital photographs (side and top angled views) of a double angle collet (Collet 3), manufactured by Kennametal of Latrobe, PA.
Digital photographs (side and top views) of a 5C collet (Collet 4), manufactured by Hardinge of Elmira, NY.
Digital photographs (side and top angled views) of a precision collet (Collet 5), manufactured by Kennametal of Latrobe, PA.
Digital photographs (side and top angled views) of a double angle collet (Collet 6), manufactured by Kennametal of Labtrobe, PA.
Digital photographs (side, top and angled views) of an aluminum collet (Collet 7), manufactured by Hudson Precision of Broadview, IL.
Digital photographs (side and top views) of a single slot collet (Collet 8), manufactured by Hudson Precision of Broadview, IL.
Digital photographs (side and top angled views) of a barrel collet (Collet 9), manufactured by Hudson Precision of Broadview, IL.

(List continued on next page.)

*Primary Examiner*—Steven C. Bishop
(74) *Attorney, Agent, or Firm*—McCracken & Frank

(57) ABSTRACT

A tool holding apparatus includes a spindle and a collet nut engaged with a spindle wherein a recess is defined between the spindle and the collet nut. A collet is disposed in the recess and includes a first tapered portion and a second tapered portion spaced from the first tapered portion, wherein the first and second tapered portions form substantially equal angles with respect to a longitudinal center line of the collet.

22 Claims, 10 Drawing Sheets

U.S. PATENT DOCUMENTS

| | | | | |
|---|---|---|---|---|
| 2,844,377 A | * | 7/1958 | Hull et al. | 279/55 |
| 2,983,036 A | | 5/1961 | Guard | 29/231 |
| 3,026,116 A | | 3/1962 | Marini | 279/48 |
| 3,246,903 A | * | 4/1966 | Sattler | 279/47 |
| 4,162,080 A | | 7/1979 | Buck | 279/1 DC |
| 4,215,871 A | | 8/1980 | Hirsch et al. | 279/48 |
| 4,725,064 A | * | 2/1988 | Glimpel et al. | 279/47 |
| 4,817,972 A | | 4/1989 | Kubo | 299/42 |
| 4,860,497 A | | 8/1989 | Ohya et al. | 51/98.5 |
| 4,902,177 A | | 2/1990 | Burnett | 409/234 |
| 5,277,435 A | | 1/1994 | Kramer et al. | 279/9.1 |
| 5,301,961 A | | 4/1994 | Wozar | 279/46.2 |
| 5,613,692 A | * | 3/1997 | Lloyd | 279/57 |
| 5,722,124 A | * | 3/1998 | Wisniewski | 24/295 |
| 6,062,574 A | | 5/2000 | Yorde | 279/49 |
| 6,155,576 A | | 12/2000 | Yorde | 279/49 |

OTHER PUBLICATIONS

Digital photographs (side and angled top views) of an barrel collet (Collet 10), manufactured by Hudson Precision of Broadview, IL.

Digital photographs (side and angled top views) of an barrel collet (Collet 11), manufactured by Hudson Precision of Broadview, IL.

Digital photographs (side and angled top views) of an aluminum collet (Collet 12), manufactured by Hudson Precision of Broadview, IL.

Digital photographs (side, angled and top views) of An aluminum collet (Collet 13), manufactured by Hudson Precision of Broadview, IL.

Catalog pages from MSC Industrial Supply Company (2000–2001), pp. 1769, 2447–2453, 2462–2468, 2476–2478, 2480.

Catalog pages from "Collets for Automatics", Hardinge, Inc., Elmira, NY, brochure–2287A (Jan. 1998); p. V, Chapter 5 pp. 1, 4–6, and 8–10.

* cited by examiner

1

HOLDING APPARATUS WITH IMPROVED RETENTION ABILITY AND METHOD OF HOLDING A TOOL

TECHNICAL FIELD

The present invention relates to holding devices, and, more particularly, to an apparatus for holding a rotary tool.

BACKGROUND ART

Rotary working devices have long been available that utilize removable rotary bits or other working tools as sanding heads, grinding heads, or the like. A rotary working device includes a collet nut that grips the working tool during operation of the working device. In a known collet nut a collet is carried in a recess between a collet nut and an end portion of a spindle driven by a motor. Typically, the collet nut includes internal threads that engage external threads of the spindle. Rotation of the collet nut causes the nut to advance toward or retract from the spindle, thereby changing the axial size of the recess in which the collet is located and thereby causing the spacing between collet teeth to change so that working tools of various diameters can be accommodated.

Yorde U.S. Pat. No. 6,155,576, discloses a collet disposed in a recess between a spindle and a collet nut threaded onto the spindle. The collet includes four segmented jaw portions each carried by a shank portion. The shank portions are, in turn, integral with a base portion. The base portion is disposed at a first end of the collet and the jaw portions are disposed at a second end of the collet. Each of the jaw portions includes a first frusto-conical camming surface at the first and of the collet and a second frusto-conical camming surface axially spaced from the first frusto-conical camming surface and disposed at a central portion of the collet intermediate the first and second ends thereof. When the collet nut is threaded on the spindle, the first and second frusto-conical camming surfaces of the jaw portions ride on an inner frusto-conical camming surface of the collet nut and a chamfered end surface of the spindle, respectively, and the jaw portions are moved radially inwardly or outwardly.

One disadvantage encountered in the Yorde device results from the process of forming the collet. Specifically, outer surfaces of the collet are machined from round bar stock and a central bore of the collet is drilled through the jaw segments. In the disclosed example, a uniform hole diameter of 0.080 inches is formed for a $1/8^{th}$ inch maximum tool shank diameter. Thereafter, first and second longitudinal slots are sequentially cut to define the jaw portions. The jaw portions are then spread and the collet may or may not be heat treated. In the disclosed example, this spreading causes the diameter of the bore at the first end of the collet to increase to about 0.130 inch and the diameter at approximately the central portion of the collet to increase to about 0.110 inch. According to the Yorde patent, the collet is said to be capable of clamping and holding a tool shank in a range between $1/32^{nd}$ inch and $1/8^{th}$ inch diameter. However, in practice, this device has been found to encounter holding problems during use. These problems arise, in part, from the lack of precision in cutting the slots (particularly the second slot due to the lack of rigidity caused by the existence of the first slot) and are further due to mismatches between the radii of curvature of the tool shank and the central bore of the collet and mismatches between the frusto-conical camming surfaces and the chamfered end surface of the spindle. FIGS. 1 and 2 illustrate simplified cross sections of the Yorde device under a first condition wherein a tool shank 4 of 0.125 inch diameter is inserted in a central bore 5 originally drilled to a 0.094 inch diameter and wherein each of first and second slots 6, 7 are off center by 0.002 inch. As can be seen by a careful examination of FIGS. 1 and 2, the difference in radii of curvature of the collet nut 9, as represented by the curved line 12, and the outer surfaces of the jaw portions 14, as represented by a curved line 16, results in contact of the collet nut 9 with each of the jaw portions 14 at a central section 17. In addition, each jaw portion 14 contacts the tool shank 14 at a highly localized area 18 (the area 18 is essentially a line of contact extending along the length of the tool shank 14). This condition results in an off-center application of highly localized holding forces on the tool shank 14. A similar condition arises during contact of the chamfered end surface of the spindle with the second frusto-conical camming surfaces of the jaw portions. Typically, these conditions result in run out and frequent release of the tool.

An opposite but analogous condition typically arises when the tool shank diameter is smaller than the diameter of the hole drilled to form the central bore. Specifically, the collet nut 9 contacts each of the jaw portions 14 at one or more locations located circumferentially outside of the area of contact of each of the jaw portions with the tool shank 14. Again, an off-center holding force condition arises, resulting in run out and release of the tool.

A further difficulty with the Yorde device results from the fact that the inner frusto-conical camming surface of the collet nut and the chamfered end surface of the spindle (and the mating surfaces of the jaw portions) are disposed at greatly different angles with respect to a longitudinal centerline of the tool. This results in differential bending moments being applied to the jaw portions 14 and prevents the development of uniform holding forces on the tool along the length thereof. A further difficulty with the Yorde device results from the difference in hardness between the hardened collet and the collet nut and spindle. Specifically, the collet nut and spindle are commonly made from 12L14 steel, which is a soft material at a Rockwell hardness of B90. The difference in hardness between the collet and the collet nut and spindle may result in the collet tearing material away from the tapered portions of the collet nut and spindle, causing permanent damage to the components and adversely affecting the assembly accuracies.

SUMMARY OF THE INVENTION

In accordance with one aspect of the present invention, a tool holding apparatus includes a spindle and a collet nut engaged with a spindle wherein a recess is defined between the spindle and the collet nut. A collet is disposed in the recess and includes a first tapered portion and a second tapered portion spaced from the first tapered portion, wherein the first and second tapered portions form substantially equal angles with respect to a longitudinal center line of the collet.

According to a further aspect of the present invention, a combination includes a spindle, a collet nut engaged with the spindle wherein a recess is defined between the spindle and the collet nut and a collet disposed in the recess. A tool is engaged by the collet and the collet includes a plurality of fingers each having first and second tapered portions. The collet nut includes a third tapered portion that engages the first tapered portion of each finger at first and second contact areas associated with such finger. In addition, each finger engages a shank of the tool at a third contact area associated with such finger. A first line extending between the first and third contact areas associated with a finger forms an angle less than or about equal to 32 degrees with respect to a second line extending between the second and third contact areas associated with the same finger.

In accordance with yet another aspect of the present invention, a method of holding a tool having a tool shank wherein the shank has a diameter less than or substantially equal to a particular diameter comprises the steps of providing a section of stock and drilling a bore of the particular diameter through the section of stock. First and second slots are formed in the section of stock from a first end thereof extending toward but not fully to a second end thereof wherein the slots define a plurality of fingers, each finger including a main portion and a shank portion connecting the main portion to a base portion. The section of stock is placed in a recess between a collet nut and a spindle and the tool shank is inserted into the drilled bore of the section of stock. The collet nut is engaged with the plurality of fingers so that the fingers bear against and retain the tool shank therebetween.

Other aspects and advantages of the present invention will become apparent upon consideration of the following detailed description.

DESCRIPTION OF THE PREFERRED EMBODIMENTS

Figure 1:
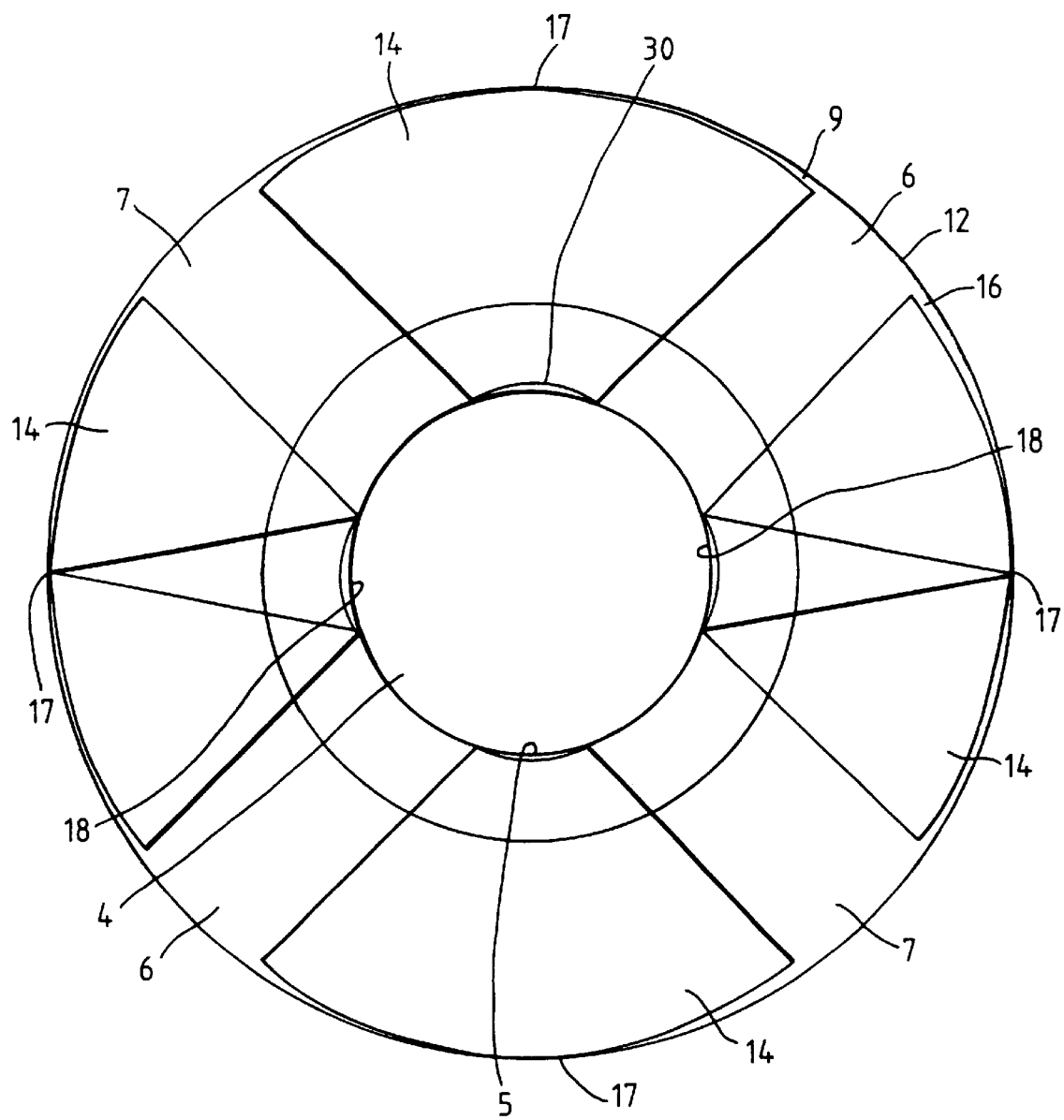
FIGS. 1 and 2 are fragmentary sectional views of a prior art tool holding device, FIG. 2 being an enlarged view of FIG. 1.
Figure 2:
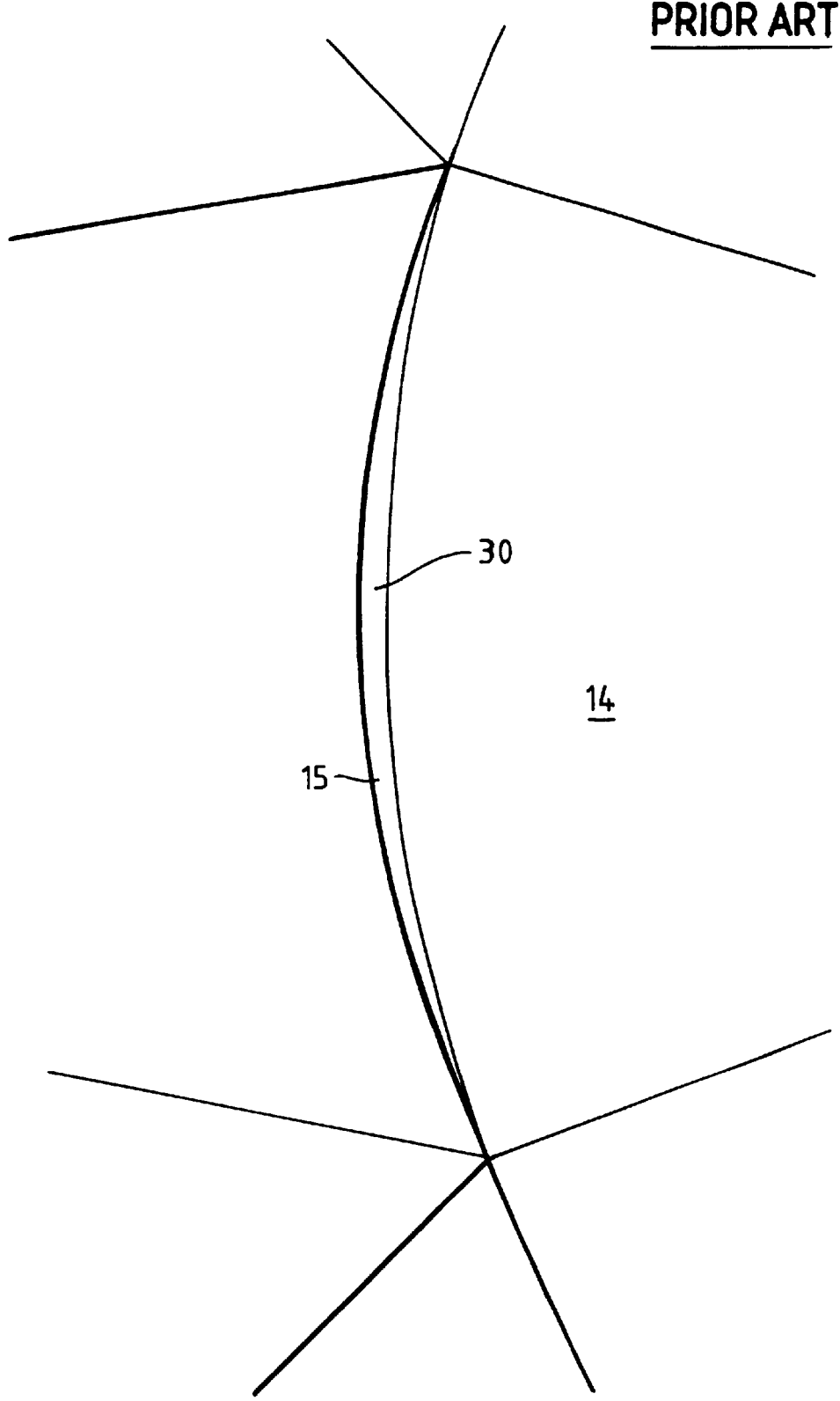
Figure 3:
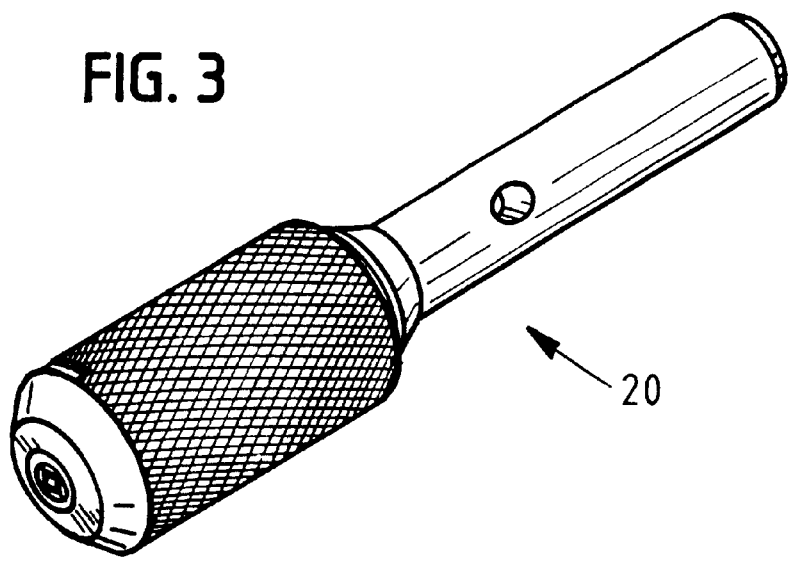
FIG. 3 is an isometric view of a first embodiment of a tool holding apparatus according to the present invention.

Referring now to FIGS. 3–6 a first embodiment of a tool holding apparatus 20 according to the present invention is shown. The tool holding apparatus includes a collet nut 22 engaged with an end 24 of a spindle 26 of a rotary working device (not shown), such as a ROTOZIP® rotary tool manufactured by Rotozip Tool Corporation of Cross Plains, Wis. Preferably, this engagement is by way of interengaging threads 28 and 30 carried by the collet nut 22 and the end 24 of the spindle 26, respectively, although any other engagement arrangement could alternatively be used.

A recess 32 is disposed between the collet nut 22 and the spindle 26 and a collet 34 is disposed in the recess 32. The collet 34 includes a base portion 36 and a plurality of fingers 38a–38d coupled to the base portion 36. The fingers 38a–38d are defined by first and second slots 40a, 40b that are perpendicular to one another. The fingers 38a–38d are identical, and hence, only the finger 38a will be described in detail. The finger 38a includes a main portion 42a that is coupled to the base portion 36 by a shank portion 44a. The main portion 42a includes a first tapered portion 46a and a second tapered portion 48a spaced from the first tapered portion 46a by an intermediate portion 50a.

Figure 4:
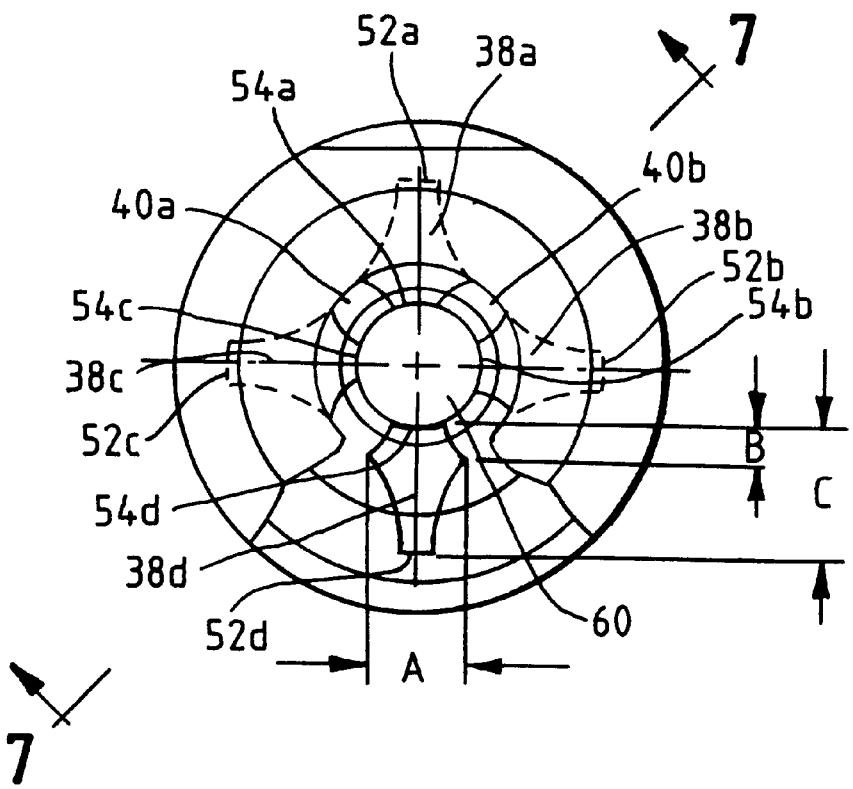
FIG. 4 is an end elevational view of the holding apparatus of FIG. 3 with portions of the collet nut broken away.
Figure 6:
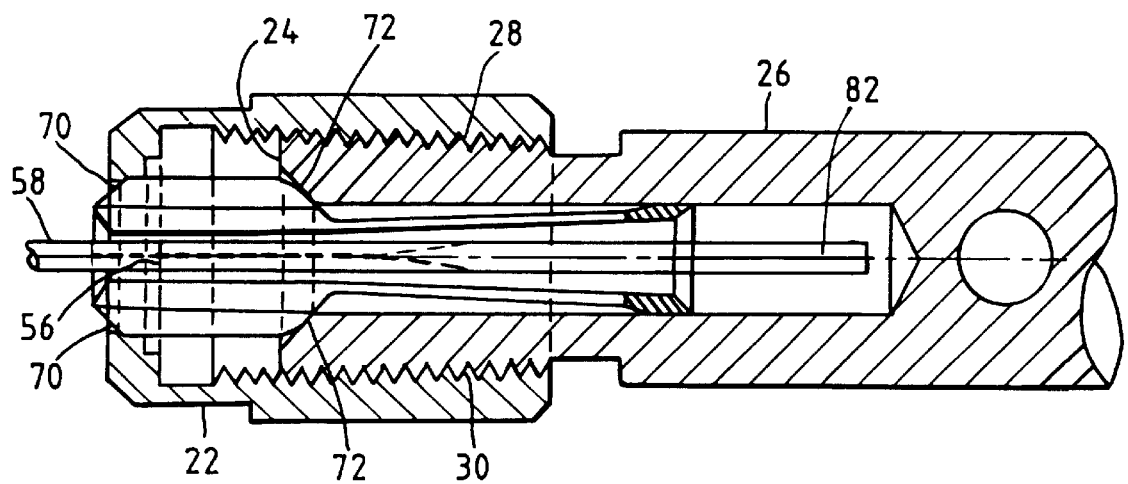
Figure 7:
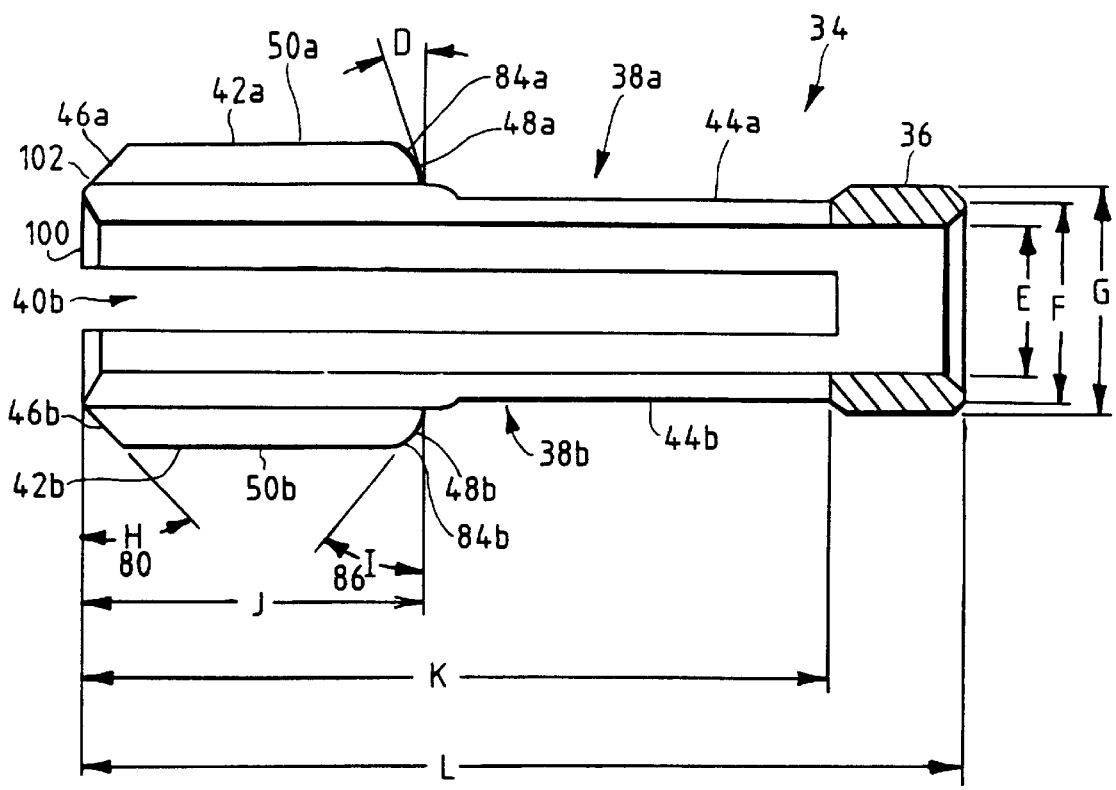
FIG. 7 is a sectional view taken along the lines 7—7 of FIG. 4 of the collet illustrating sample dimensions therefor.

As seen in FIG. 4, the finger 38a includes a radially outer portion 52a and a radially inner portion 54a. The outer portion 52a is contacted by the collet nut 22 and the spindle 26 whereas the inner portion 54a contacts a shank 56 of a tool 58 (FIG. 6). In accordance with the preferred embodiment, the outer diameter of the shank 56 is not substantially larger than the diameter of a bore 60 extending through the collet 34. Specifically, the collet 34 is intended for use with tool shanks of a diameter substantially equal to or smaller than the diameter of the bore 60, unlike the collet of the Yorde device described above, which is intended for use with tool shanks larger or smaller than the diameter of the bore extending therethrough.

Figure 5:
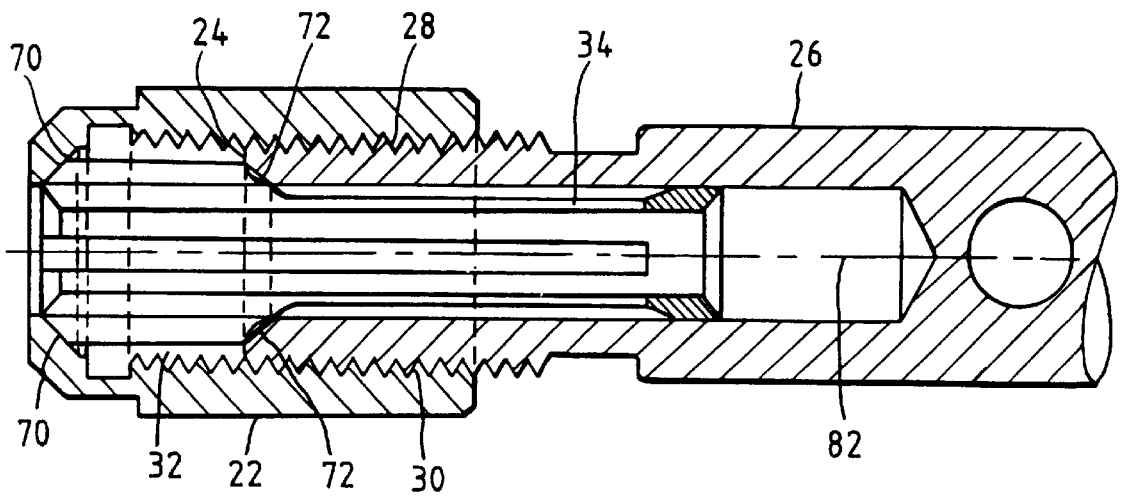
FIGS. 5 and 6 are sectional views taken generally along the line 5—5 of FIG. 4 before and after threading of the collet nut onto the spindle of FIG. 3.

The fingers 38b–38d include main portions 42b–42a, shank portions 44b–44a, first tapered portions 46b–46a, second tapered portions 48b–48a, intermediate portions 50b–50a, outer portions 52b–52d and inner portions 54b–54d identical to the corresponding structures of the finger 38a as described above. As seen in FIGS. 5 and 6, the first tapered portions 46a–46d are contacted by a tapered surface 70 of the collet nut 22 and the second tapered portions 48a–48dare contacted by a tapered surface 72 of the spindle 26. Threading of the collet nut 22 onto the spindle 26 causes the tapered surfaces 70 and 72 to advance toward one another, thereby resulting a camming action against the tapered portions 46 and 48. This camming action causes the main portions 42 to move radially inwardly from the position shown in FIG. 5 toward the position shown in FIG. 6. During this movement, the main portion 42 of each finger 38 is deflected radially inwardly such that the inner portions 54a–54d are moved into engagement with the shank 56 of the tool 58 while the main portions 42 remain connected to the base portion 36 by the shank portion 44.

Preferably, the each of the first tapered portions 46a–46d forms an included angle 80 with respect to a longitudinal centerline 82 of the collet 34. Also preferably, the angles 80 are substantially equal to 45 degrees. Still further, each of the second tapered portions 48a–48d includes a section 84a–84a, respectively, that forms an included angle 86 with respect to the longitudinal centerline 82. Again, these angles 86 are also preferably substantially equal to 45 degrees.

The tapered surface 70 of the collet nut 22 forms an included angle 90 with respect to the longitudinal centerline 82 and the tapered surface 72 of the spindle 26 forms an included angle 92 with respect to the centerline 82. In accordance with the preferred embodiment, the angles 90 and 92 are substantially equal to 40 degrees. The slight mismatch in the angles 80 and 90 and the slight mismatch between the angles 86 and 92 results in reduced areas of contact of the surfaces 70 and 72 with the portions 46 and the sections 84, thereby resulting in smooth displacement of the fingers 38 during threaded advancement of the collet nut 22 onto the spindle 26. In addition, causing the angles 80 and 86 to be substantially equal to 45 degrees result in substantially equal radial deflections of the axial ends of the main portions 42 as the collet nut 22 is threaded onto the spindle 26 so that the tool shank 56 is gripped throughout the full lengths of the main portions 42 (provided, of course, that the shank 56 is inserted into the collet to such extent).

Figure 8:
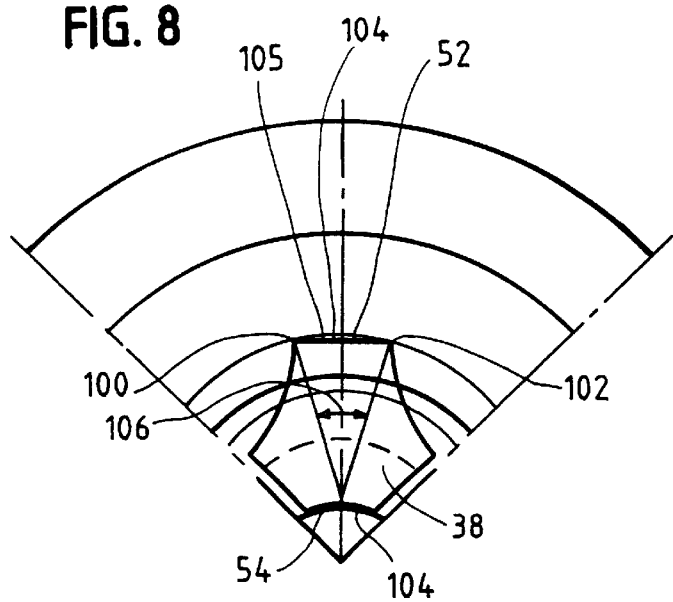
FIG. 8 is an enlarged, fragmentary, simplified sectional view taken generally along the lines 8—8 of FIG. 6 illustrating application of forces to the collet and tool by the collet nut during holding of the tool.
Figure 9:
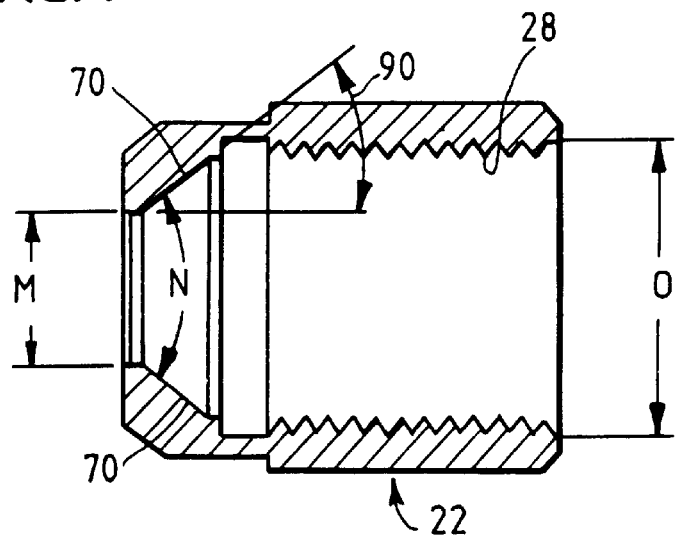
FIG. 9 is a sectional view of the collet nut of FIGS. 5 and 6 illustrating sample dimensions therefor.
Figure 10:
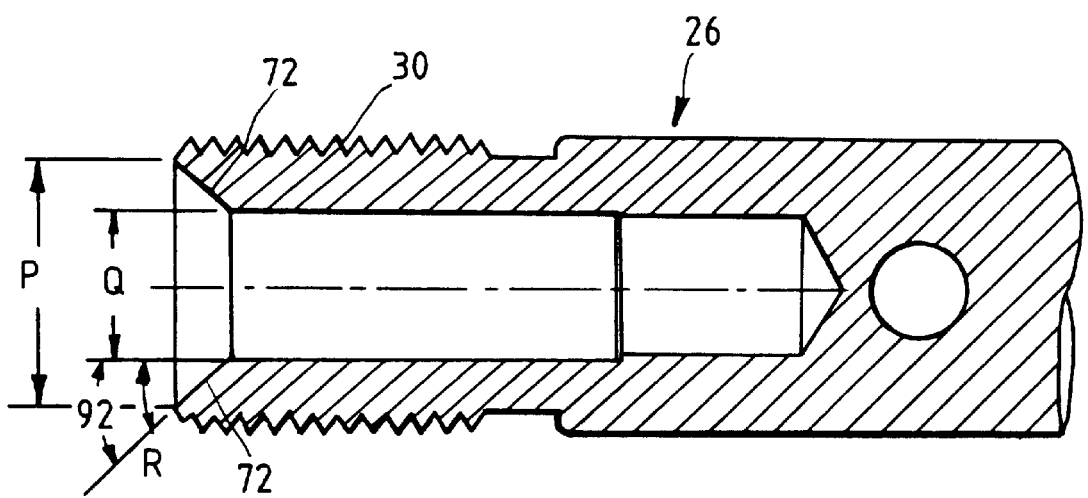
FIG. 10 is a sectional view of the spindle of FIGS. 5 and 6 illustrating sample dimensions therefor.

Referring next to FIG. 8, the tapered surface 70 of the collet nut 22 contacts each finger 38 at spaced first and second contact areas 100,102 of the tapered portion 46 thereof. In addition, the tapered surface 72 of the spindle 26 preferably contacts each finger 38 at corresponding angularly spaced contact areas of the latter. Still further, each finger 38 preferably contacts the tool shank 56 at a third contact area 104 between the first and second contact areas 100, 102. Preferably, the angular extent of each finger 38 at an outer surface 105 of the finger 38 is limited so that an angle 106 between a line extending from the first to the third contact areas and a line extending from the second to the third contact areas is less than or equal to 32 degrees. By so limiting this angle, holding forces are more nearly centered on the tool shank so that the incidence of run out and resulting release of the tool is minimized.

The collet 34 is preferably fabricated by selecting a section of stock of steel or other material and shaping the outer profile of the section of stock using a lathe and a mill or other shaping apparatus. Using a lathe and a mill removes portions from the section of stock radially outside the fingers to create the angular extend of the fingers. Either before or after the shaping step, a bore of a particular diameter is drilled or otherwise formed through the section of stock and at least first and second slots are cut or otherwise formed in the section of stock from a first end thereof extending toward but not fully to a second end thereof to define the fingers 38. The resulting collet is then finished and austempered. Thereafter, the collet is placed in a recess between a collet nut and a spindle and the tool shank 56 is placed into the drilled bore of the section of stock. As noted above, the tool shank 56 preferably has an outer diameter not significantly larger than the particular diameter. Specifically, the collet 34 and other structures shown in FIGS. 3–10 are preferably intended for use with tool shanks between 1/16 and 1/8 inch. The collet nut 22 is then advanced onto the spindle 26 such that the tapered surfaces 70, 72 bear against and displace the fingers 38 radially inwardly so that the fingers 38 bear against and retain the tool shank 56 therebetween.

Preferably, the collet 34 has a Rockwell hardness of between about RC 40 and RC 46 and the collet nut and spindle are made of 1144 steel at either a Rockwell hardness of RC 22 or RC 30. The collet nut and spindle can be austempered for a higher Rockwell hardness, but a Rockwell hardness at or below the Rockwell hardness of the collet is preferred. Referring to FIGS. 4, 7, 9 and 10, the collet 34, collet nut 22 and spindle 26 preferably, although not necessarily, have the dimensions noted below as identified by the reference designations in such figures. The dimensions are not to be construed as limiting the present invention, but are provided as exemplary only (dimensions are in inches, except as noted):

| Reference | Dimension |
| --- | --- |
| A | 0.10 |
| B | 0.03125 |

-continued

| Reference | Dimension |
| --- | --- |
| C | 0.0625 |
| D | 22.5 degrees |
| E | 0.128–0.131 |
| F | 0.170–0.167 |
| G | 0.188–0.185 |
| H | 45 degrees |
| I | 45 degrees |
| J | 0.237–0.296 |
| K | 0.6188 |
| L | 0.7500 |
| M | 0.200 |
| N | 80 degrees |
| O | 0.562 |
| P | 0.317–0.323 |
| Q | 0.183–0.187 |
| R | 40 degrees |

Preferably, the collet 34 is vibratory tumbled in small stones to round the edges of the tapered portions 46, 48 so that such edges do not damage the tapered surfaces 70, 72.

Figure 11:
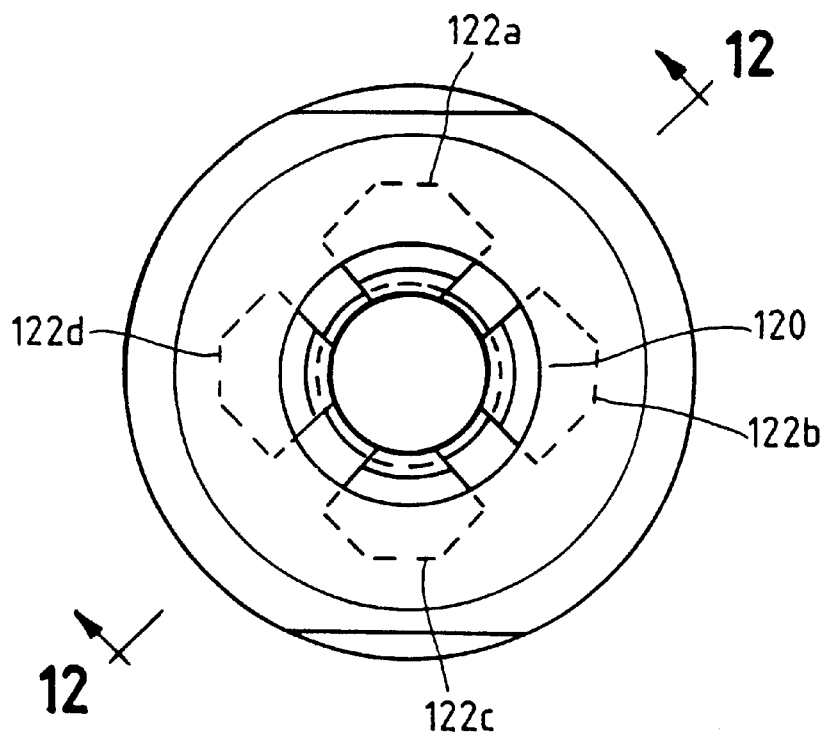
FIG. 11 is an end elevational view of a further embodiment of the present invention.
Figure 12:
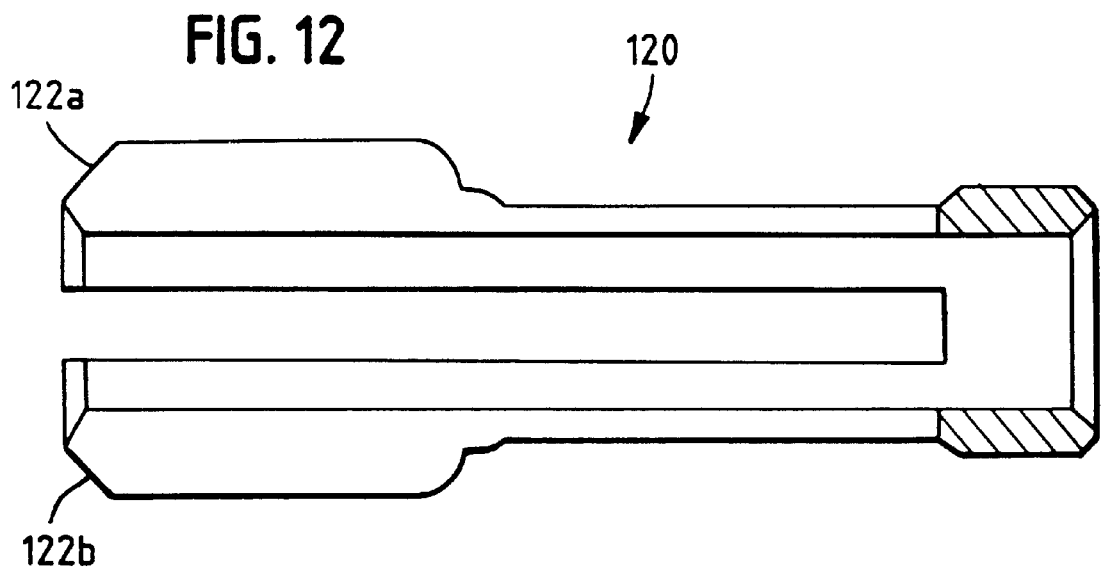
FIG. 12 is an isometric view of the collet of FIG. 11.
Figure 13:
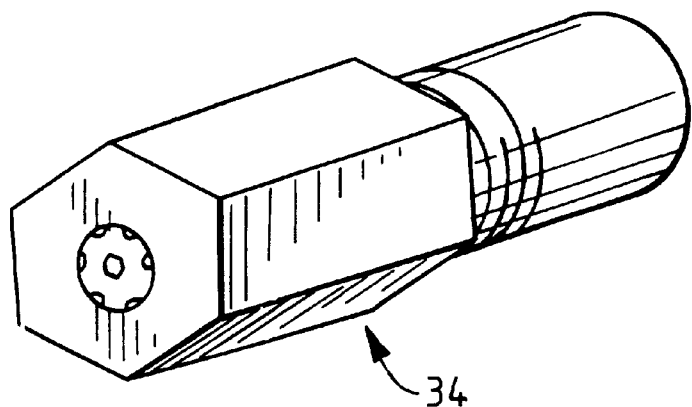
FIGS. 13 and 14 are views similar to FIGS. 3 and 4, respectively, illustrating yet another embodiment of the present invention.
Figure 14:
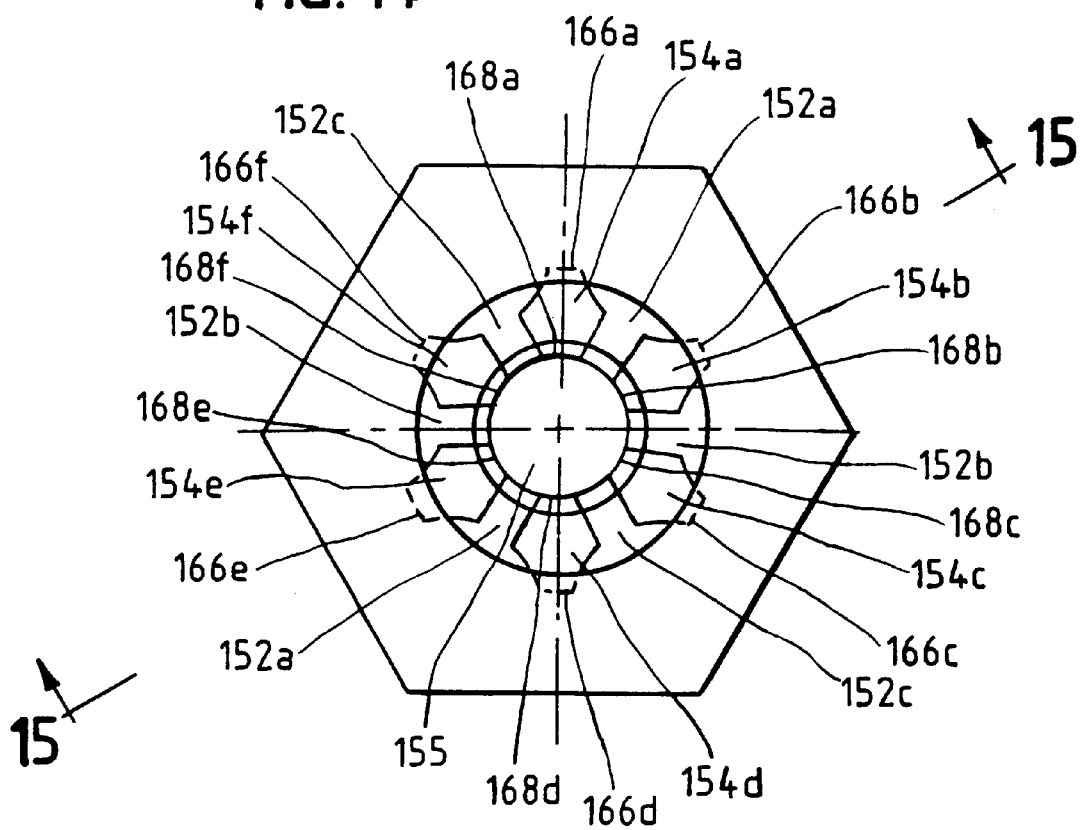

FIGS. 11 and 12 illustrate an alternative embodiment, wherein the collet 34 is replaced by a collet 120, which is identical to the collet 34, except that the cross sectional shape of the collet 120, before forming of the slots therein, is substantially square, but with beveled corners 122a–122d. This permits use of readily available bar stock for the collet. The collet 120 is otherwise identical to the collet 34 and is usable with the collet nut 22 and the spindle 26 as described above. In addition, the collet 120 is fabricated in the manner described above in connection with the collet 34.

FIGS. 13–16 illustrate yet another embodiment wherein the collet 34 is replaced by a collet 150. The embodiment of FIGS. 13–16 is particularly suited to retain tool shanks of a diameter larger than the upper range limit that can be accommodated by the devices of FIGS. 3–12. In particular, the collet 150 is capable of accommodating tool shanks between 1/8 and 1/4 inch, although it could be dimensioned to accept other sizes of tool shanks.

Figure 15:
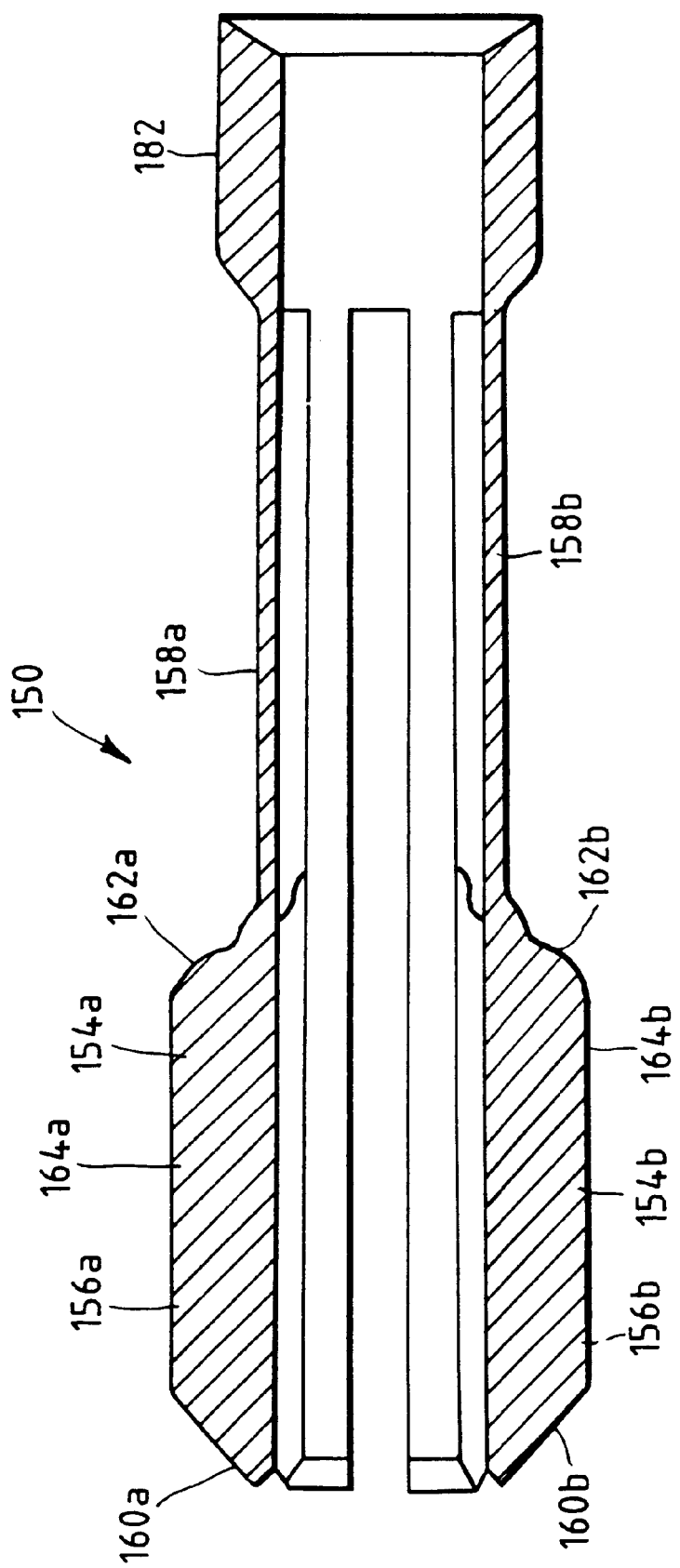
FIGS. 15 and 16 are views similar to FIGS. 5 and 6 of the embodiment of FIGS. 13 and 14.
Figure 16:
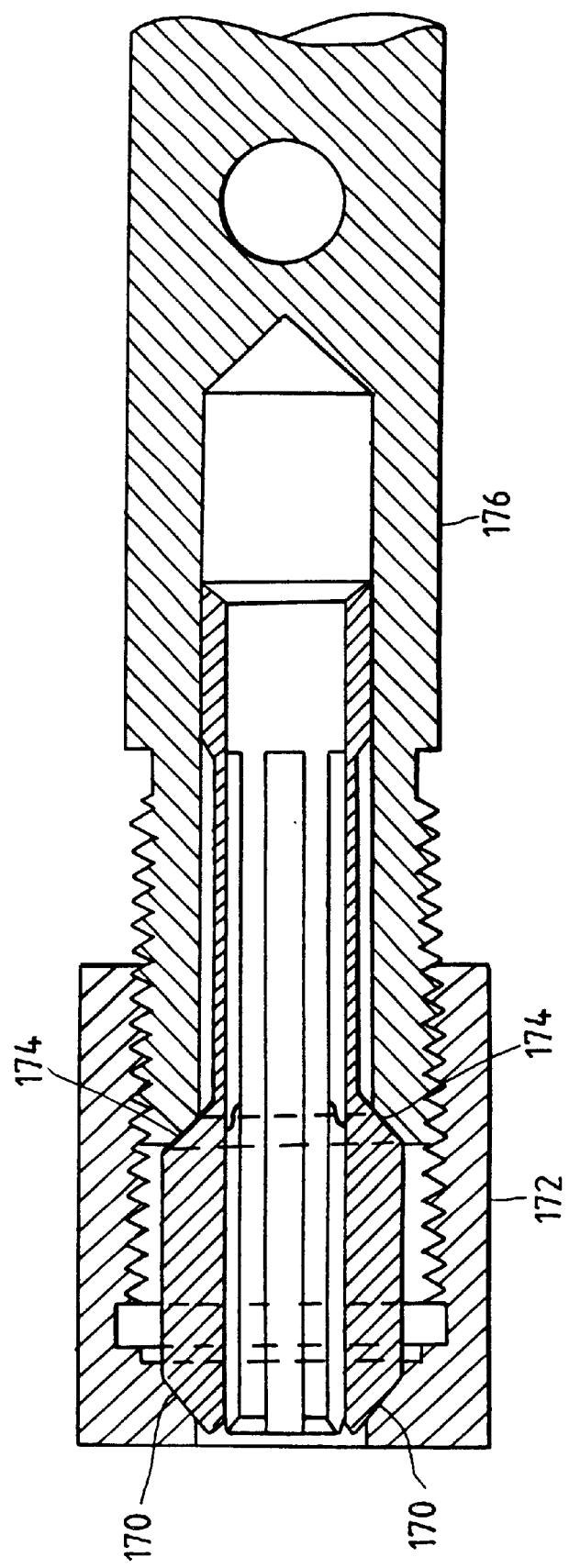

The collet 150 is preferably fabricated from hexagonal bar stock, and is fabricated as noted in connection with the embodiments illustrated in FIGS. 3–12, except for the fact that first through third slots 152a–152c are cut or otherwise formed in the bar stock to define first through sixth fingers 154a–154f. In this regard, as in the previous embodiments, a bore 155 is drilled or otherwise formed in the collet 150 prior to formation of the slots 152a–152c. The bore has a diameter substantially equal to the diameter of the largest shank to be accommodated thereby (in the illustrated embodiment, 1/4 inch). The collet 150 is otherwise identical to the collet 34 except for the overall dimensions thereof. Specifically, as in the previous embodiments, each finger 154a–154f of the collet 150 includes main portions 156a–156f, shank portions 158a–158f, first tapered portions 160a–160f, second tapered portions 162a–162f, intermediate portions 164a–164f, outer portions 166a–166f and inner portions 168a–168f identical to the corresponding structures of the fingers 38a–38d as described above. As seen in FIGS. 15 and 16, the first tapered portions 160a–160f are contacted by a tapered surface 170 of a collet nut 172 and the second tapered portions 162a–162f are contacted by a tapered surface 174 of a spindle 176 (the collet nut 172 and the spindle may be identical to the collet nut 22 and the spindle 26, except for the overall dimensions thereof). Threading of the collet nut 172 onto the spindle 176 causes the tapered surfaces 170 and 174 to advance toward one another, thereby resulting a camming action against the tapered portions 160 and 162. This camming action causes the main portions 156a–156f to move radially inwardly from the position shown in FIG. 15 toward the position shown in FIG. 16. This movement causes the inner portions 168 of the fingers 154 to contact a tool shank 180 while the main portions 156 remain connected to a base portion 182 by the shank portions 158.

As in the previous embodiments, each of the tapered surfaces 170, 174 forms an included angle of approximately 40 degrees with respect to the longitudinal axis of the collet 150 and each of the tapered portions 160, 162 forms an included angle of approximately 45 degrees with respect to the same longitudinal axis. Also, each finger 154 preferably contacts the tool shank 180 at a contact area that is angularly located between contact areas of the collet nut 172 with the outer portions 166 of the fingers 154. Preferably, in this embodiment the angle corresponding to the angle 106 of the embodiments described above is less than or equal to approximately 20 degrees. These features, as in the foregoing embodiments, result in smooth and efficient gripping of a tool shank.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. Tool holding apparatus, comprising:
   a spindle;
   a collet nut engaged with the spindle wherein a recess is defined between the spindle and the collet nut; and
   a collet disposed in the recess and including fingers each having a first plurality of tapered portions and a second plurality of tapered portions spaced longitudinally from the first plurality of tapered portions, wherein the first and second pluralities of tapered portions form substantially equal angles with respect to a longitudinal center line of the collet;
   wherein the tool holding apparatus is adapted to receive tool shanks of varying radii of curvature not substantially greater than an inner radius of curvature of each finger of the collet such that the collet engages a shank at a center portion of the inner radius of curvature of each finger and engages the collet nut substantially only at spaced contact areas of outer surfaces of each finger.

2. The tool holding apparatus of claim 1, wherein the collet is fabricated of austempered steel.

3. The tool holding apparatus of claim 1, wherein the angles formed by the first and second tapered portions of the collet with respect to the longitudinal center line are about 45 degrees.

4. The tool holding apparatus of claim 1, wherein the collet includes a plurality of fingers defined by a number of slots extending from a first end of the collet toward a second end of the collet.

5. The tool holding apparatus of claim 4, wherein each finger comprises a main portion and a shank portion connecting the main portion to a base portion.

6. The tool holding apparatus of claim 5, wherein the main portion of each finger is deflected radially inwardly into engagement with a tool shank while remaining connected to the base portion by the shank portion of the finger.

7. The tool holding apparatus of claim 6, in combination with a tool engaged by the collet.

8. The tool holding apparatus of claim 7, wherein the collet nut includes a third tapered portion that engages the first tapered portion of a particular finger at first and second contact areas and wherein the particular finger engages a shank of the tool at a third contact area.

9. The tool holding apparatus of claim 8, wherein a first line extending between the first and third contact areas forms an angle less than or about equal to 32 degrees with respect to a second line extending between the second and third contact areas.

10. The tool holding apparatus of claim 1, wherein the collet nut is threaded onto a threaded end of the spindle.

11. The tool holding apparatus of claim 1, wherein the collet nut includes a third tapered portion that forms an angle of about 40 degrees with respect to the longitudinal center line of the collet nut.

12. The tool holding apparatus of claim 9, wherein the spindle includes a fourth tapered portion that forms an angle of about 40 degrees with respect to the longitudinal center line of the collet nut.

13. A combination, comprising:
    a spindle;
    a collet nut engaged with the spindle wherein a recess is defined between the spindle and the collet nut;
    a collet disposed in the recess; and
    a tool engaged by the collet;
    wherein the collet includes a plurality of fingers each having first and second tapered portions and wherein the collet nut includes a third tapered portion that engages the first tapered portion of each finger substantially only at spaced first and second contact areas associated with such finger and wherein each finger engages a shank of the tool at a third contact area associated with such finger and wherein a first line extending between the first and third contact areas associated with a finger forms an angle less than or about equal to 32 degrees with respect to a second line extending between the second and third contact areas associated with the same finger.

14. The combination of claim 13, wherein the collet is fabricated of austempered steel.

15. The combination of claim 13, wherein first and second angles formed by the first and second tapered portions of the collet with respect to a longitudinal center line of the collet are substantially equal to about 45 degrees.

16. The combination of claim 15, wherein the fingers are defined by a number of slots extending from a first end of the collet toward a second end of the collet.

17. The combination of claim 16, wherein each finger comprises a main portion and a shank portion connecting the main portion to a base portion.

18. The tool holding apparatus of claim 17, wherein the main portion of each finger is deflected radially inwardly into engagement with the shank of the tool while remaining connected to the base portion by the shank portion of the finger.

19. A collet, comprising:
    a base portion; and
    a plurality of fingers coupled to the base portion, wherein each finger includes a main portion coupled to the base portion by a shank portion, wherein each main portion includes a first tapered portion and a second tapered portion spaced from the first tapered portion and wherein the first and second tapered portions form substantially equal angles with respect to a longitudinal center line of the collet;

wherein the collet is adapted to receive tool shanks of varying radii of curvature not substantially greater than an inner radius of curvature of each finger of the collet such that the collet is adapted to engage a shank at a center portion of the inner radius of curvature of each finger and wherein the collet is further adapted to engage a collet nut substantially only at spaced contact areas of outer surfaces of each finger.

20. The collet of claim 19, wherein the collet is fabricated of austempered steel.

21. The collet of claim 19, wherein the angles formed by the first and second tapered portion of the collet with respect to the longitudinal center line are about 45 degrees.

22. The collet of claim 19, wherein the fingers are defined by a number of slots extending from a first end of the collet toward a second end of the collet.

* * * * *